Nov. 9, 1948.  H. R. REYNOLDS  2,453,594

JOURNAL BOX

Filed Dec. 1, 1945

INVENTOR
Harry R. Reynolds
BY
Mitchell Buhert
ATTORNEYS.
44-130

Patented Nov. 9, 1948

2,453,594

UNITED STATES PATENT OFFICE 2,453,594

JOURNAL BOX

Harry R. Reynolds, New Britain, Conn., assignor to The Fafnir Bearing Company, New Britain, Conn., a corporation of Connecticut Application December 1, 1945, Serial No. 632,245

7 Claims. (Cl. 308—41)

My invention relates to a journal box, particularly though not exclusively adapted for railway use and more particularly to thrust means for a journal.

My invention constitutes an improvement over the thrust bearings disclosed in Hellyar Patents 2,102,952, December 21, 1937, and 2,155,657, April 25, 1939.

It is an object of my invention to provide a journal box and, specifically, a thrust bearing for the shaft of a journal box, which is of relatively simple construction and which will prolong the operating life of the thrust bearing.

Other objects and various features of novelty and invention will be hereinafter pointed out or will become apparent to those skilled in the art.

In the drawings which show, for illustrative purposes only, a preferred form of the invention—

Figure 1:
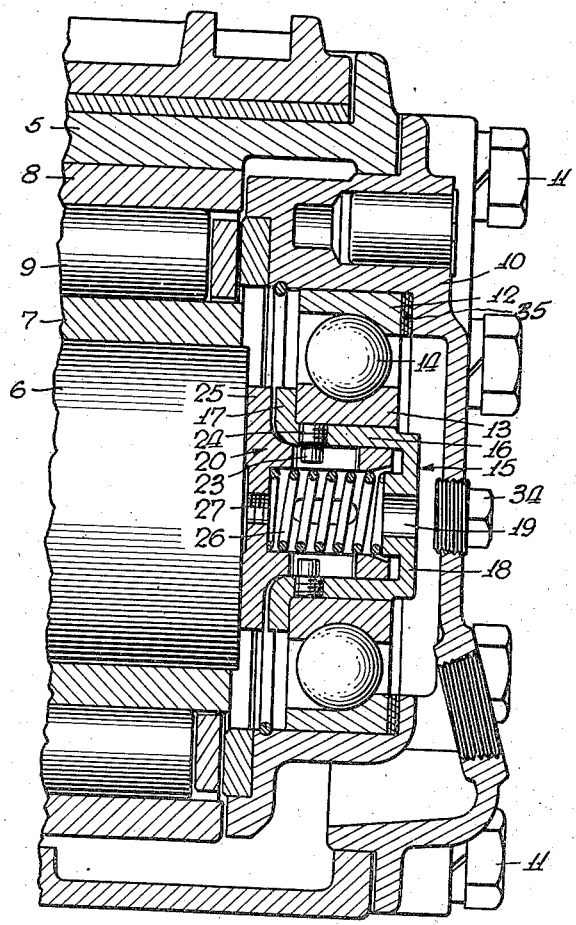
Fig. 1 is a fragmentary view in central, vertical section through a journal box illustrating the invention.
Figure 2:
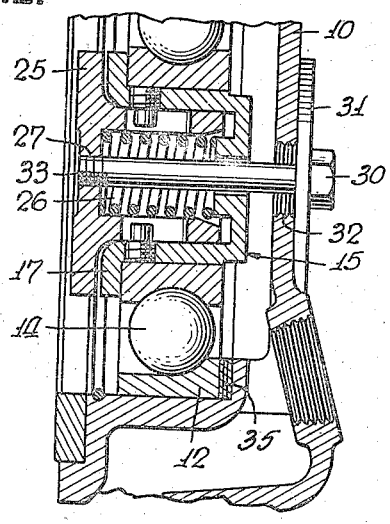
Fig. 2 is a fragmentary view, on a reduced scale, of the journal box shown in Fig. 1 and illustrating parts used in assembly.
Figure 3:
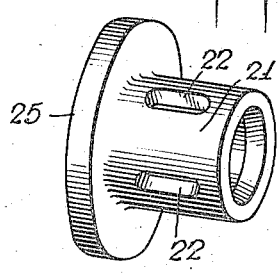
Fig. 3 is an isometric detail view of a thrust bushing.

The journal box illustrated includes a box 5, in which a shaft or axle 6 is journaled. The shaft may carry a bearing sleeve 7, and the box may carry a bearing liner 8. Anti-friction bearing members, such as rollers 9, are interposed between the sleeve and liner and rotatably support the shaft in the box. During normal operation the journal or shaft 6 moves longitudinally as the car moves along the rails. My invention relates to certain improvements in the thrust bearing for taking and resisting the end thrusts of the journal 6.

The thrust bearing is mounted in a fixed part of the journal box, which I term the end cap 10, and which in this case is fastened to the journal box as by means of fastening members 11, as is common practice. The end cap 10 is counterbored to provide a seat for the outer bearing ring 12. An inner bearing ring 13 and the anti-friction bearing members, such as balls 14 interposed between the two bearing rings, form parts of a thrust bearing in which the inner ring 13 is designed to rotate with the journal 6 while the outer ring 12 is fixed in the end cap.

In the form illustrated, the inner ring carries a plug 15, which may comprise a sleeve portion 16, pressed or otherwise fixed in the bore of the inner ring 13. The plug preferably has an outwardly directed flange 17 to engage one edge of the inner ring and form a substantial abutment for transmitting forces from the journal 6 to the inner ring 13. The plug 15 preferably has a closed end 18 having an aperture 19 therein. The plug carries a bushing, which in the form illustrated includes a sleeve portion 21, which slidably fits within the bore of the plug. The bushing is keyed to the plug so that the plug and bushing rotate as one, but the bushing may slide longitudinally in the plug.

In the form shown, the sleeve 21 may be provided with a plurality of slots 22 and the plug may carry a corresponding plurality of keys 23 which may be in the form of screws threaded into the plug as indicated at 24. The heads of the screws are preferably flush with the outer surface of the plug and are inserted in the keying position before the inner ring 13 is pressed onto the plug. Thus, the keys are securely held against loss. The bushing has an outwardly directed thrust flange 25 which has a substantial thrust face for engagement with the end of the shaft, as appears clearly in Fig. 1. The rear face of the flange 25 preferably has about the same contour as the adjacent face of the plug flange 17 so that when the flanges 17 and 25 come together, they have a substantially solid bearing on each other whereby the thrust transmitted to the thrust face of the flange 25 will be solidly transmitted through the plug to the inner bearing ring 13. The bushing 20 is preferably made of bronze when the shaft and plug 15 are steel. Within the sleeve 21, and bottomed in the bore therein, is a compression spring 26, which bears at its other end against the closed end 18 of the plug. For a purpose to be described, the bushing may have a threaded bore 27 therein.

During normal operation, the journal 6 moves axially but the thrust face of the flange 25 will be constantly in engagement with the end of the shaft, due to the fact that the bushing carrying the flange 25 is slidable in the plug and the spring 26 constantly urges the thrust face into engagement with the end of the shaft. Therefore, as the journal or shaft 6 rotates, the bushing will be rotated and through the keys 23 and plug 15 such rotation will be transmitted to the inner bearing ring 13. Thus, the inner bearing ring will be rotated by and with the shaft. When the journal moves during normal operation toward the right from the position shown in Fig. 1, the flanges 25 and 17 will come into abutting engagement and the end thrust of the shaft will then be transmitted through those flanges directly to the inner bearing ring. With the inner bearing ring in constant rotation during rotation of the shaft, the balls or other anti-friction bearing members 14 are not likely to be damaged nor to damage the raceways of the rings even though the shaft in its endwise movement transmits a considerable shock to the anti-friction bearing. Furthermore, with the construction shown, the shock or thrust is transmitted from the flange 25 to the flange 17 and there is no hammering action directly upon the inner bearing ring 13. Any hammering or peening action which might be detrimental to the inner bearing ring is therefore taken by the flanges 17—25 and the bearing ring itself is spared such damage, hammering, or peening. Since the bearing is in constant rotation with the shaft, any thrust shock will be transmitted over substantial areas of the bearing rings and anti-friction bearing members and there is unlikely to be any peening or spalling action of the rings or anti-friction bearing members.

It will be seen that when the end cap 10 is removed from the journal box, the spring 26 will project the bushing 15 toward the left as far as permitted by the limiting slots and keys. Therefore, when the end cap is to be put in place, the force of the substantial spring 26 will first have to be overcome before the end cap could be put in place and secured by the securing members 11. I have therefore provided means for retracting the thrust bushing so that it will not ordinarily engage the end of the journal and therefore the end cap with the thrust bearing may be readily put in place.

In the form shown, I employ a bolt 30 which passes through a plate or strut 31 resting on the outside of the cover cap 10 and which also passes through an aperture 32 in the cover cap. The end of the bolt may be threaded into the threaded bore 27 as is indicated at 33. Thus, when the spring is compressed, the bolt may be put in place and the thrust bushing will be held in retracted position so that the cover cap may be readily put in place and secured to the box. After the cover cap has been secured, the bolt 30 is unscrewed and removed. The thrust bushing then is moved into engagement with the end of the shaft by the spring 26. The opening 32 may be closed as by means of a pipe plug 34.

During normal operation, it is desirable to permit the shaft or journal 6 to shift axially in the journal boxes. A substantial clearance is shown between the back of the thrust member 20 and its abutment 17 to permit such axial shifting. Such clearance would normally be from, say, ⅛ inch to ⅜ inch. The clearance is determined in the form illustrated by the extent to which the outer ring 12 is shimmed out, as indicated at 35.

By means of my improved construction, it is a very simple matter to determine the extent of end play in the shaft or journal and the permissible end play can readily be determined and controlled by proper shimming, as at 35. It will be clear that when the thrust member 20 has its thrust face in engagement with the end of the journal 6, as shown in Fig. 1, the thrust member 20 can be moved axially away from the end of the shaft simply by pulling outwardly on the bolt 30 until the thrust member 20 is in engagement with the abutment 17. The extent to which the bolt 30 is pulled outwardly may be readily measured and the clearance thus easily determined. The overall end play may be determined by taking measurements, as above indicated, at the opposite ends of the journal and the end play can be limited to just the extent desired by proper shimming after it has been determined how much end play is desirable. Previous methods of determining the end play and the consequent extent of shimming required has involved a cumbersome method. My means of measuring end play and determining the required degree of shimming is direct, accurate, and requires no particular apparatus nor any cut and try methods.

While the invention has been described in considerable detail and a preferred form illustrated, it is to be understood that changes may be made within the scope of the invention as defined in the appended claims.

I claim:

1. In a journal box having a rotatable and axially movable shaft journaled therein, a thrust bearing for the shaft comprising inner and outer bearing rings with interposed anti-friction bearing members, means for mounting the outer of said bearing rings against movement away from the end of the shaft, a plug fixedly secured in the bore of the inner of said rings and having an outwardly facing flange engaging the edge of the inner bearing ring adjacent the end of the shaft, a bushing including a sleeve slidably mounted in said plug, means for limiting the sliding movement of said sleeve in said plug, a spring interposed between said plug and bushing for urging the latter toward the end of the shaft, said bushing having a thrust flange for cooperation at one side with the end of the shaft and for cooperation at the other side with the outwardly facing flange on the plug.

2. In a journal box having a rotatable and axially movable shaft journaled therein, an end cap for said journal box, a thrust bearing for said shaft carried by said end cap, said thrust bearing including inner and outer bearing rings with interposed anti-friction bearing members, said end cap having a counterbore for receiving and holding the outer bearing ring, a plug fixedly carried by said inner bearing ring, a bushing non-rotatably carried by said plug, said bushing comprising a sleeve fitting said plug and having an outwardly directed thrust flange facing the end of the shaft for cooperation therewith, and a spring for urging said bushing in a direction to cause said flange to maintain contact with the end of the shaft, whereby said inner bearing ring is kept in rotation with and by said shaft.

3. In a journal box having a rotatable and axially movable shaft journaled therein, a thrust bearing for said shaft, including inner and outer bearing rings with interposed anti-friction bearing members, means for mounting the outer bearing ring in a fixed part, a plug carried by said inner bearing ring, a bushing slidably carried by said plug, keying means for limiting the sliding movement of said bushing relatively to said plug and for constraining said bushing and plug to rotate together with said inner bearing ring, said bushing having a thrust flange for coaction with the end of the shaft, and a spring for urging said bushing in a direction to cause the flange thereof to engage the end of the shaft.

4. In a journal box having a rotatable and axially movable shaft journaled therein, a thrust bearing for said shaft including inner and outer bearings rings with interposed anti-friction bearing members, means for fixedly mounting said outer bearing ring in a fixed part, a plug mounted within the bore of said inner bearing ring, a bushing including a sleeve slidably mounted in said plug, said sleeve having a slot therein, a key carried by said plug and coacting with said slot whereby said bushing is constrained to rotate with said plug and inner bearing ring and is free to slide longitudinally the distance determined by said slot and key, said bushing having a thrust face for engagement with the end of the shaft, and a spring for constantly urging said thrust face into engagement with the end of said shaft, whereby said bushing, plug, and inner bearing ring will be rotated by and with said shaft.

5. In a journal box having a rotatable and longitudinally movable shaft journaled therein, an end cap for said journal box, a thrust bearing for said shaft carried by said end cap, said thrust bearing including inner and outer bearing rings with interposed anti-friction bearing members, a member having a thrust face for engagement with the end of the shaft, means for causing said member having the thrust face to rotate with the inner bearing ring, a spring for urging said thrust face into engagement with the end of the shaft so as to maintain contact and cause said member and inner bearing ring to rotate with the shaft, and means coacting with said member having the thrust face and with a part of said end cap for drawing said member having the thrust face in a direction away from the end of the shaft, for the purpose set forth.

6. In a journal box means having a rotatable and axially movable shaft journaled therein, a thrust member carried by said box means and engageable with said shaft, an abutment for said thrust member to limit the movement of the latter by said shaft, resilient means between said thrust member and said abutment for resiliently urging said thrust member into engagement with said shaft, said thrust member having means for engagement by an actuator extending to the outside of said box means for moving said thrust member to determine the clearance distance between said thrust member and the shaft when said thrust member is in engagement with said abutment member, whereby the clearance distance may be determined from the outside of said box means by measuring the distance said actuator is moved when said thrust member is moved between the shaft and abutment.

7. In a journal box means having a rotatable and axially movable shaft journaled therein, a thrust member carried by said box means and engageable with said shaft, abutment means for said thrust member to limit the movement of the latter by said shaft, means resiliently urging said thrust member away from said abutment means and toward said shaft, said abutment means having an aperture generally on the axis of said shaft, actuating means engageable with said abutment means and extending through said aperture and engageable with said thrust member for compressing said resilient means whereby the clearance distance between said thrust member and said abutment means may be determined from outside said abutment means by measuring the movement of said actuating means, and further whereby said actuating means may be disengaged from said thrust member and said abutment means to permit fully resilient action of said thrust member on said shaft.

HARRY R. REYNOLDS.

REFERENCES CITED

The following references are of record in the file of this patent:

UNITED STATES PATENTS

| Number | Name | Date |
| --- | --- | --- |
| 1,269,238 | Winfield | June 11, 1918 |
| 1,874,449 | Clifford | Aug. 30, 1932 |
| 1,971,946 | Brittain | Aug. 28, 1934 |
| 2,094,968 | Searles | Oct. 5, 1937 |